W. H. C. HAMANN, Jr.
WHEEL GUARD FOR WHEELED DISK HARROWS.
APPLICATION FILED SEPT. 28, 1920. RENEWED JULY 8, 1921.

1,388,814.

Patented Aug. 23, 1921.

L. B. James
WITNESS:

William H. C. Hamann, Jr.
INVENTOR
BY Victor J. Evans
ATTORNEY

UNITED STATES PATENT OFFICE.

WILLIAM H. C. HAMANN, JR., OF SNYDER, NEBRASKA.

WHEEL-GUARD FOR WHEELED DISK HARROWS.

1,388,814.  Specification of Letters Patent.  Patented Aug. 23, 1921.

Application filed September 28, 1920, Serial No. 413,381. Renewed July 8, 1921. Serial No. 483,342.

*To all whom it may concern:*

Be it known that I, WILLIAM H. C. HAMANN, Jr., a citizen of the United States, residing at Snyder, in the county of Dodge and State of Nebraska, have invented new and useful Improvements in Wheel-Guards for Wheeled Disk Harrows, of which the following is a specification.

My present invention has for its object to practically improve wheeled disk harrows by the provision of a guard for one of the ground wheels of the harrow, calculated to effectively prevent the disk adjacent to the wheel from catching into the spokes of the latter and breaking the same.

To the attainment of the foregoing the invention consists in the improvement as hereinafter described and definitely claimed.

In the accompanying drawings, hereby made a part hereof:—

Similar numerals of reference designate corresponding parts in all of the views of the drawings.

Figure 1:
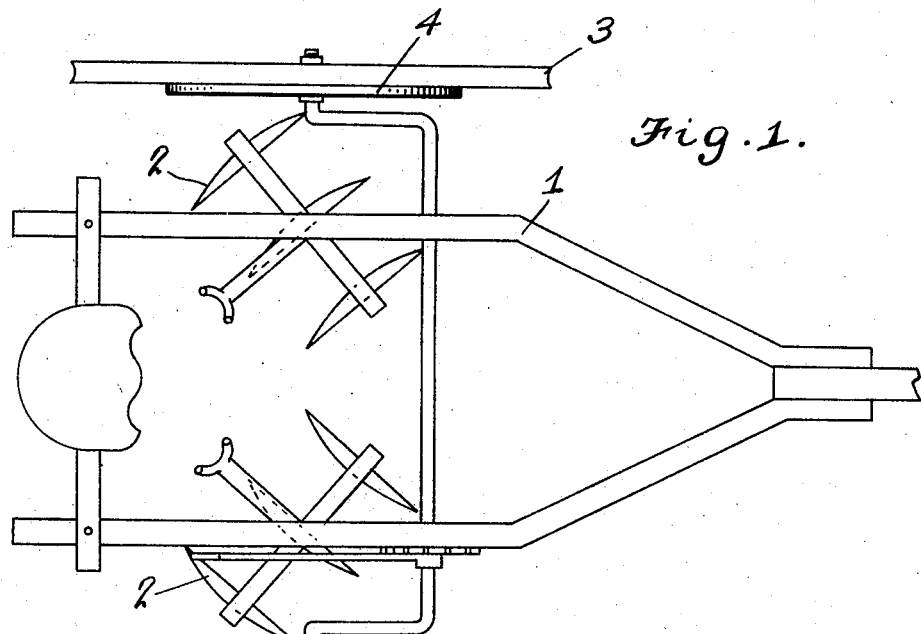
Figure 1 is a general view illustrating a wheeled disk harrow one of the ground wheels of which is equipped with my improvement.
Figure 2:
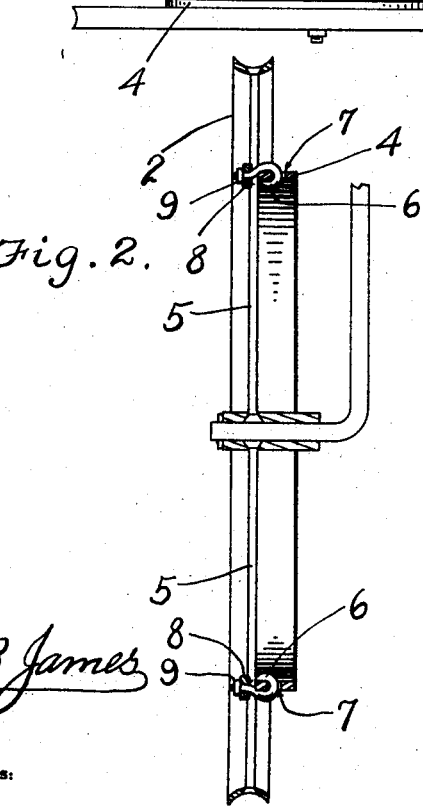
Fig. 2 is an enlarged detail view showing the arrangement of my novel guard relatively to the wheel that carries the same and the adjacent disk of the harrow.
Figure 3:
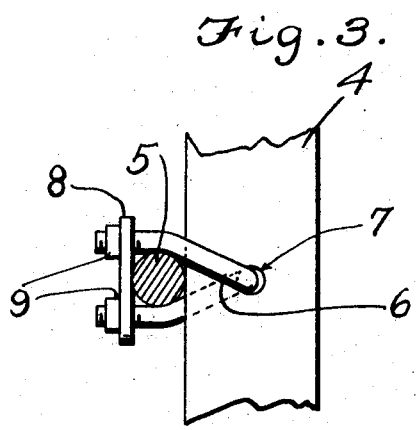
Fig. 3 is an enlarged detail view showing the preferred specific connection of the wheel guard to the spokes of the wheel.

In general the harrow is of the ordinary well known construction, including a frame 1 groups of disks 2 and ground wheels 3.

In furtherance of my invention the ground wheel 3 at the right of the harrow is provided with an annular guard 4, the function of which is to preclude or prevent the adjacent disk or disks from catching against the spokes 5 of the wheel with a view to averting breaking of the said spokes. The said annular guard 4 which is preferably of metal is arranged at the inner sides of the spokes 5 and is fixedly connected to certain of the spokes. For each of the said connections I prefer to employ a shackle 6 the bight of which is arranged in an aperture 7 in the guard 4, and the threaded ends of which are arranged at opposite sides of one spoke 5 and carry a plate 8 that is clamped against the outer side of the spoke through the medium of nuts 9 mounted on the threaded end portions of the shackle.

Manifestly my novel guard is susceptible of ready application, and when properly applied as shown between the wheel and an adjacent disk or disks is calculated to effectively avoid breakage of the spokes by a disk or disks.

Having described my invention, what I claim and desire to secure by Letters-Patent, is:—

1. The combination with a ground wheel and a disk of a wheeled disk harrow, of an annular guard to protect the spokes of the ground wheel from the disk or disks; the said guard being fixedly connected to some of the spokes of the wheel and being interposed between the spokes and the disk or disks.

2. The combination with a ground wheel and a disk of a wheeled disk harrow, of an annular guard to protect the spokes of the ground wheel from the disk or disks; the said guard being formed of metal and extending laterally inward from the spokes against which its outer edge is arranged and being provided with apertures, shackles arranged with their bights in said apertures and also arranged in straddling relation to some of the spokes, clamps on the shackles and arranged at the outer side of the spokes, and nuts threaded on the end portions of the shackles and adapted to clamp said plates against the spokes.

In testimony whereof I affix my signature.

WILLIAM H. C. HAMANN, JR.